Patented July 17, 1951

2,560,916

UNITED STATES PATENT OFFICE 2,560,916

CEMENT FOR LAMINATING SHEETS OF PAPER OR LIKE MATERIALS

Philip S. Barnhart, West Springfield, and John C. Miller, Westfield, Mass., assignors to Westfield River Paper Company, Inc., Russell, Mass., a corporation of Massachusetts No Drawing. Application September 8, 1945, Serial No. 615,248

2 Claims. (Cl. 260—27)

This invention relates to an improved laminating cement, and particularly to such a cement used to unite or laminate sheets of paper or like material, commonly used for wrapping or packaging a wide range of commodities.

Though the laminating cement of our invention will be described from the point of view of its efficacy in the lamination of glassine, greaseproof and other dense papers into material to be thereafter formed into envelopes, bags, containers, pouches and other enclosures, it is to be understood that this description is merely illustrative of one of the principal advantageous uses of the cement. Since the invention resides in the cement itself, it is, of course, understood that the scope of the same is not limited by any particular use to which such cement may be put.

In forming laminated papers into envelopes, bags, containers, pouches and other enclosures, a mouth or opening is left, through which to fill the enclosures. These openings must thereafter be closed by a seal which gives full protection to the contents. Various methods for doing this have been practiced heretofore. One sealing is accomplished by applying lacquer to at least one of the two exterior surfaces that are to be brought together, and applying heat and pressure through those surfaces to form the proper bond. In another form, the sealing material includes an adhesive carried by a solvent so that heat is required to drive off the solvent and pressure is added to again secure the surfaces together. Another form, also employing heat and pressure, causes the opening to be sealed by applying an additional thermoplastic band about the opening in the enclosure when the same is made, and closing such opening thereafter by means of heat and pressure applied through said band. Another sealing practiced in the making of bags from laminated material is accomplished by the use of water phase adhesives. None of these sealings have, however, produced uniformly perfect results, while, without such results, considerable waste of packaged materials is experienced and the marketability of the packages or enclosures, themselves is limited. The above limitations also hold true in manufacturing bags or pouches where the side and bottom seams are sealed by heat.

In the heat sealing by the use of lacquers or solvent bearing adhesives, a true seal requires that an interengagement of the fibers of the materials being sealed actually takes place. In the lacquer sealing, temperatures of approximately 300° F. are employed along with pressure, and, in a number of instances, it has been found that even on the application of this temperature alone, the cement securing the plies of the paper together struck through to the exterior surface of the material and destroyed the effectiveness of the lacquer adhesive by preventing the same from causing the necessary interengagement of the fibers. In some instances, the pressure employed in manufacturing the laminated material as it came from the laminating machine, caused the laminating cement to strike through the paper and reach its outer surface to thereby interfere with the effectiveness of the lacquer or other sealing material. In other instances, merely by the passage of time, the prior art cements have been known to penetrate the paper and spoil the lacquer on envelopes, bags, etc., which were stored awaiting use. Solvent-bearing adhesives were similarly affected.

Where thermoplastic sealing bands were employed, there have been times when such bands were found to be ineffective and to fail to stay on, or make a tight bond, due to the laminating cement having already struck through the paper or being caused to strike through by the application of the sealing heat. Prevention of the formation of an effective seal in the instances just discussed was, according to our investigation, usually caused by the striking through of the wax base material used as the laminant. This not only rendered the heat sealing procedures ineffective, but was just as damaging where water-phase adhesives were employed for sealing openings. Apparently a film of wax, plasticizer or similar component of the cement often struck through to the outside surfaces of the plies merely as a result of the static pressure. Thus, even though the adhesive used to seal the opening was of the water-phase variety, and no heat was used, a proper bond was unobtainable.

The defects of the prior laminations remained uncorrected, and apparently no one was able to pin them down or correct them prior to our investigation. As a result of that investigation, we discovered that the laminating cements previously employed were either of too low a viscosity or were of such variable viscosity that even though effective when applied, they did not remain so. Viscosity varied under heat, pressure or merely under natural causes, to such an extent that at unpredictable times and under various conditions the cement would penetrate to the outer surfaces of the laminated material and form a film on those surfaces which rendered them incapable of being sealed to a similar sheet in any one of the manners above described. It was thus our conclusion that in order to overcome the prior art defects and assure uniform sealing, it would be necessary to introduce a definite viscosity controller into the cement. Merely increasing the viscosity of the cement would not do, for with prior art materials, that viscosity might vary from time to time and under different conditions, as already pointed out. Furthermore, when crude rubber was used, and the proportion of it in the cement increased in order to increase the viscosity, a point was soon reached where the moisture-vapor transmission rates were greatly increased. This, of course, destroyed the value of the laminated material for moisture-proof packaging purposes. To be more specific, when the laminating cement is employed in very thin films, that is, films in which the cement used amounts to about five pounds per ream, the moisture-vapor transmission increases when crude rubber is used in the mix to the extent of six per cent and upwards.

We have discovered, however, that it is possible to definitely control the viscosity of the cement, and to do so without detracting from the resistance to moisture-vapor transmission. For this purpose, we have obtained excellent results by controlling the viscosity of the cement by the use of a polyisobutylene-resin combination employed in proper proportions. An example of such a proportion is where five parts of polyisobutylene are used with 25 parts of resin. This combination provides the proper adhesion and a controlled viscosity when used as part of a cement whose other components are microcrystalline wax and a suitable plasticizer. By employing other proportions, within the ranges of 1 to 25 parts of polyisobutylene and 1 to 30 parts of resin, a wide variety of laminants can be produced having from soft to rigid characteristics and also having viscosities within a wide range. For example, we have found it is possible to make a very soft laminant with a satisfactory viscosity and melting point for successful heat sealing application without detracting from resistance to moisture-vapor transmission. This results from the use of the polyisobutylene-resin combination as a viscosity controller, but is only one illustration of the wide variety of laminants, applicable to many and varying conditions which can be made and used successfully by incorporating the viscosity controller of the invention.

The polyisobutylene employed should be of high molecular weight or, in other words, should have a molecular weight in the range between 75,000 and 200,000. More particularly, polyisobutylene having a molecular weight between 100,000 and 125,000 produces excellent results. This material is obtained already admixed with microcrystalline wax of the same type as is used for the wax component of the cement.

Polyisobutylene and resin, when admixed in the proportion above indicated, control the viscosity of the cement to maintain it uniform, enable a more viscous composition to be employed without affecting the moisture-vapor transmission rates, and improve the non-flowing characteristics of the cement. Thus paper laminated by means of such cement can be sealed in any of the manners above described without having the sealing affected by the cement or any component thereof striking through to the outer surface of the paper.

The resins employed in combination with the polyisobutylene may be any of the resins compatible with wax such as rosin, gum rosin, ester gum, polymerized rosin, hydrogenated rosin, thermoplastic terpene resins, or the ethylene glycol esters of rosin or rosin derivatives, and certain coumarone-indene resins.

The microcrystalline wax that is needed for this particular cement should preferably have a melting temperature of above 150° F. and may run up to 200° F.

As plasticizers, in order to keep the resin plastic and pliable, we have found that the proper complement to the cement materials just disclosed can be provided by using high melting point petrolatums, 125° F., dibutyl-sebacate, diamyl-phthalate, dibutyl-phthalate, "Hercolyn," butyl oleate, butyl stearate, tributyl phosphate, or comparable materials. "Hercolyn" is a hydrogenated methyl ester of rosin. These furnish the proper plasticizing effect for the cement and yet are controlled by the viscosity control above described, so that they do not show a tendency to strike through the sheets and form a deleterious film on the outside thereof. When, however, a cement is desired which is characterized by stiffness, the quantity of the plasticizer in the cement can be materially reduced or it can be omitted entirely. In the latter instance, the cement would consist merely of microcrystalline wax, polyisobutylene and resin.

Depending upon the conditions to be met, effective laminants can be made by selecting the components within the ranges of 1–25 parts of polyisobutylene, 1–30 parts of resin, 95–50 parts of microcrystalline wax and 0–20 parts of a suitable plasticizer. Assuring the presence of a plasticizer, the limits here would be within 1 to 25% of polyisobutylene, 1 to 30% resin, 50 to 95% microcrystalline wax, and .5 to 20% plasticizer. As a specific example to meet one specific set of requirements, we have found that a composition made up of two per cent polyisobutylene, 23 per cent resin, 72 per cent microcrystalline wax and three per cent of a suitable plasticizer gives excellent results. For other requirements, the selection of components could, of course, vary throughout the ranges previously indicated. To create a more viscous mix, the percentage of polyisobutylene should be increased, though to control that viscosity, the proportion of polyisobutylene to resin should be maintained within the said ranges. Resin in this combination will also tend to increase the melting point of the mix which is desirable for this control.

A cement formed in accordance with our invention, as just disclosed, renders the formation of envelopes, bags, containers, pouches and other enclosures out of laminated paper highly effective. In the first place, the enclosures have uniform characteristics throughout their walls, which characteristics remain uniform throughout a wide temperature range. In addition, the cement, while maintaining such uniformity and holding the laminated sheets properly together throughout such a temperature range, nevertheless keeps down the moisture-vapor transmission rate.

Since enclosures of the type under consideration are of little value unless their openings can be sealed with full effectiveness, the cement of this invention marks a turning point in this art. By the use of our cement, the openings in the enclosures may be effectively sealed whether the same be done by the use of the proper sealing lacquers, solvent adhesives, sealing bands or water- phase adhesives. Furthermore, the effectiveness remains whether the enclosures be stored for a substantial period of time before being filled and sealed, or be filled and sealed as soon as received.

Having disclosed our invention, what we claim as new and wish to secure Letters Patent for is:

1. A laminating cement comprising polyisobutylene of a molecular weight in the range of between 75,000 and 200,000, a microcrystalline wax of a melting point of above 150° F., a resin compatible with microcrystalline wax selected from the group consisting of rosin, polymerized rosin, hydrogenated rosin and the ethylene glycol esters of rosin, and a plasticizer, in which the polyisobutylene is present in the amount of substantially 2%, the resin is present in the amount of substantially 23%, the plasticizer is present in the amount of substantially 3% and the remainder is microcrystalline wax.

2. A laminating cement comprising more than 50% microcrystalline wax and from .5–20% of a plasticizer, said cement including a viscosity controller, said viscosity controller comprising polyisobutylene and a resin compatible with micro-crystalline wax selected from the group consisting of rosin, polymerized rosin, hydrogenated rosin and the ethylene glycol esters of rosin, the polyisobutylene being present in from 1–25% of the total of the cement, said cement being characterized by the ability to maintain effective viscosity when subjected to sealing temperatures up to 300° F.

PHILIP S. BARNHART.
JOHN C. MILLER.

REFERENCES CITED

The following references are of record in the file of this patent:

UNITED STATES PATENTS

| Number | Name | Date |
|---|---|---|
| 2,142,039 | Abrams et al. | Dec. 27, 1938 |
| 2,245,494 | Padgett | June 10, 1941 |
| 2,278,141 | Warth | Mar. 31, 1942 |
| 2,298,846 | Skooglund | Oct. 13, 1942 |
| 2,319,389 | Corkery et al. | May 18, 1943 |
| 2,339,958 | Sparks | Jan. 25, 1944 |
| 2,388,984 | Mack | Nov. 13, 1945 |

OTHER REFERENCES

Warth, The Chemistry and Technology of Waxes, Reinhold Publishing Co. (N. Y.), 1947, pages 212 and 243.

Certificate of Correction

July 17, 1951

Patent No. 2,560,916

PHILIP S. BARNHART ET AL.

It is hereby certified that error appears in the printed specification of the above numbered patent requiring correction as follows:

Column 5, line 4, after "proper" insert *heat*;

and that the said Letters Patent should be read as corrected above, so that the same may conform to the record of the case in the Patent Office.

Signed and sealed this 2nd day of October, A. D. 1951.

[SEAL]

THOMAS F. MURPHY,
*Assistant Commissioner of Patents.*